(12) United States Patent
Iwaasa

(10) Patent No.: US 8,010,974 B2
(45) Date of Patent: Aug. 30, 2011

(54) DISK APPARATUS

(75) Inventor: Hiroaki Iwaasa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 509 days.

(21) Appl. No.: 12/343,777

(22) Filed: Dec. 24, 2008

(65) Prior Publication Data

US 2009/0187930 A1 Jul. 23, 2009

(30) Foreign Application Priority Data

Jan. 18, 2008 (JP) ................. 2008-008778

(51) Int. Cl.
*G11B 33/02* (2006.01)

(52) U.S. Cl. ........ 720/647; 720/643; 720/655; 720/610; 720/646; 720/636; 360/99.02; 360/99.06; 361/679.38; 361/679.37

(58) Field of Classification Search .......... 720/643, 720/647, 655, 610, 646, 636
See application file for complete search history.

(56) References Cited

U.S. PATENT DOCUMENTS

| | | | | |
|---|---|---|---|---|
| 4,109,919 | A * | 8/1978 | Elliott et al. | 720/638 |
| 5,229,987 | A * | 7/1993 | Aoki | 720/647 |
| 5,648,882 | A * | 7/1997 | Tangi et al. | 360/99.06 |
| 5,748,595 | A * | 5/1998 | Nakajima | 720/647 |
| 6,137,760 | A | 10/2000 | Okamoto | |
| 6,198,712 | B1 | 3/2001 | Okamoto | |
| 6,324,147 | B2 * | 11/2001 | Kanatani et al. | 720/647 |
| 6,377,451 | B1 * | 4/2002 | Furuya | 361/679.32 |
| 6,831,698 | B2 * | 12/2004 | Fuchimukai | 348/373 |
| 7,123,438 | B2 * | 10/2006 | Seo | 360/97.01 |
| 7,225,450 | B2 * | 5/2007 | Kim | 720/647 |
| 7,296,277 | B2 * | 11/2007 | Ohno et al. | 720/602 |
| 7,363,635 | B2 * | 4/2008 | Hibi | 720/647 |
| 7,458,085 | B2 * | 11/2008 | Cheng | 720/647 |
| 7,487,519 | B2 * | 2/2009 | Jin | 720/647 |
| 7,490,337 | B2 * | 2/2009 | Lee | 720/647 |
| 7,490,338 | B2 * | 2/2009 | Kato | 720/647 |
| 7,495,712 | B2 * | 2/2009 | Takeda | 348/836 |
| 7,679,897 | B2 * | 3/2010 | Xu et al. | 361/679.37 |
| 7,770,191 | B2 * | 8/2010 | Tamura | 720/647 |

(Continued)

FOREIGN PATENT DOCUMENTS

JP 07-282569 A 10/1995

(Continued)

*Primary Examiner* — Viet Nguyen
(74) *Attorney, Agent, or Firm* — Global IP Counselors

(57) ABSTRACT

A disk apparatus includes a chassis, a disk tray and a tray panel unit. The tray panel unit includes a panel main body and a spring body. The spring body has a coil part, a pair of end attachment parts and a middle attachment part. An axial direction of the coil part is aligned with a width direction of the tray panel unit. The pair of end attachment parts extends from both axial ends of the coil part, respectively. The end attachment parts are fixedly coupled to one of the panel main body and a front end part of the disk tray. The middle attachment part is provided to an axial middle portion of the coil part. The middle attachment part is fixedly coupled to the other of the panel main body and the front end part of the disk tray.

9 Claims, 7 Drawing Sheets

U.S. PATENT DOCUMENTS

| | | | |
|---|---|---|---|
| 7,784,068 B2 * | 8/2010 | Fujisawa | 720/636 |
| 7,856,641 B2 * | 12/2010 | Omori et al. | 720/623 |
| 7,886,316 B2 * | 2/2011 | Iwai et al. | 720/647 |
| 2005/0240951 A1 | 10/2005 | Chen et al. | |
| 2005/0257231 A1 | 11/2005 | Hibi | |
| 2007/0220533 A1 | 9/2007 | Tamura | |

FOREIGN PATENT DOCUMENTS

| | | |
|---|---|---|
| JP | 09-055005 A | 2/1997 |
| JP | 10-040671 A | 2/1998 |
| JP | 2000-231779 A | 8/2000 |
| JP | 2000-331407 A | 11/2000 |

* cited by examiner

DISK APPARATUS

CROSS-REFERENCE TO RELATED APPLICATIONS

This application claims priority to Japanese Patent Application No. 2008-008778 filed on Jan. 18, 2008. The entire disclosure of Japanese Patent Application No. 2008-008778 is hereby incorporated herein by reference.

BACKGROUND OF THE INVENTION

1. Field of the Invention

The present invention generally relates to a disk apparatus. More specifically, the present invention relates to a disk apparatus having a disk tray.

2. Background Information

With a conventional disk apparatus, a tray panel unit is mounted to a front end part of a disk tray. The disk tray is retractably attached to a device frame. In the disk apparatus, the disk tray is used to load a disk as a recording medium into the device frame and eject the disk forward with respect to the device frame. When a disk is mounted on the disk tray and loaded into the device frame, a recording surface of the disk is optically processed, and information is recorded or retrieved.

The tray panel unit includes a horizontally elongated panel main body, a horizontally elongated attachment frame and spring urging mechanisms. The attachment frame is fixed to the front end part of the disk tray. The spring urging mechanisms connects the panel main body to the attachment frame. The spring urging mechanisms includes guide shafts and compression coil springs. The guide shaft is inserted in a freely fitting state in shaft insertion holes of the attachment frame so as to extend from the panel main body. The compression coil springs are fitted on the guide shafts as spring bodies and have one end connected to the guide shafts and the other end overlapping on floor surfaces on a back surface of the attachment frame. The panel main body is always elastically urged toward the attachment frame by extending action (restoring action) of the compression coil springs. The attachment frame also includes a receiving part for bracing the panel main body urged by the compression coil springs and suppressing wobble in the panel main body.

The spring urging mechanisms are provided in two locations in a transverse direction of the tray panel unit. Rotational shifting in which one end or the other end in the transverse direction of the panel main body swings in a thickness direction of the disk tray is suppressed when two of the spring urging mechanisms are provided in the transverse direction of the tray panel unit. Therefore, this configuration helps to prevent the panel main body from becoming misaligned to an unacceptable degree with respect to the disk tray.

The disk apparatus is generally accommodated by a chassis. When the chassis includes a front panel, a tray exit/entry opening through which the disk tray of the disk apparatus exits and enters is formed in the front panel, and the disk tray moves in and out between a disk ejecting position and a disk loading position through the tray exit/entry opening.

With the disk apparatus, since the disk tray protrudes forward from the tray exit/entry opening when the disk tray is moved forward toward the ejecting position, the panel main body of the tray panel unit is separated from the tray exit/entry opening. In contrast, when the disk tray is retracted toward the loading position, the panel main body of the tray panel unit contacts with a receiving frame part formed around the tray exit/entry opening just prior to the disk tray reaching the loading position. When the disk tray retracts toward the loading position and reaches the loading position, the attachment frame of the tray panel unit that is mounted to the disk tray compresses the compression coil springs and separates from the panel main body. The panel main body therefore blocks the tray exit/entry opening in a state of being pressed against the receiving frame part of the tray exit/entry opening.

The panel main body contacts with the receiving frame part of the tray exit/entry opening just prior to the disk tray reaching the loading position when the disk tray is retracted toward the loading position. Then, the attachment frame compresses the compression coil springs and separates from the panel main body as the disk tray reaches the loading position. The impact applied to the front panel and other components absorbed and mitigated by the compression coil springs when the panel main body collides with the receiving frame part. Furthermore, the gap between the panel main body and the receiving frame part of the tray exit/entry opening is blocked and less noticeable, the collision noise is reduced and the operating quality of the disk apparatus is enhanced, and it is easier to absorb error in the assembly precision of the disk tray and other components. The panel main body prevents entry of debris from the tray exit/entry opening when the tray exit/entry opening is blocked since the panel main body is pressed against the receiving frame part of the tray exit/entry opening when the disk tray has reached the loading position. Moreover, it is harder for wind noise or the like created by the disk rotation to escape from the tray exit/entry opening.

The tray panel unit has the panel main body for blocking the tray exit/entry opening, and the spring bodies for pressing the panel main body against the receiving frame part of the tray exit/entry opening when the disk tray is retracted to the loading position. The compression coil springs are used as the spring bodies. The attachment frame and the panel main body of the tray panel unit are also connected by the spring urging mechanisms in two locations in the transverse direction of the tray panel unit.

Various proposals have been made in the past regarding the specific structure of the tray panel unit in a disk apparatus in which the tray panel unit is mounted to the front end part of the disk tray. For example, a structure is known in which the disk tray and the panel main body are connected by compression coil springs in two locations in the transverse direction (see Japanese Laid-open Patent Publication No. 10-40671, for example). A structure has also been proposed in which tension coil springs are used instead of compression coil springs, and the disk tray and panel main body are connected by tension coil springs in two locations in the transverse direction thereof (see Japanese Laid-open Patent Publication No. 7-282569, for example). A structure has also been proposed in which a horizontally elongated resin spring is integrally molded with the panel main body, and the resin spring is connected to the disk tray (see Japanese Laid-open Patent Publication No. 2000-231779, for example).

With all of the structures proposed in these patent documents, coil springs (compression coil springs or tension coil springs) are used as the spring bodies, the axial directions of the coil springs are aligned with the ejection and loading direction of the disk tray, and the substantial rotational shift of both ends in the transverse direction of the panel main body is suppressed by placing the coil springs in two locations in the transverse direction of the horizontally elongated panel main body.

However, when compression coil springs, tension coil springs, or other coil springs are used as the spring bodies, and the axial directions of the coil springs are aligned with the ejection and loading direction of the disk tray, overall dimensions of the tray panel unit, i.e., the length dimension (hereinafter referred to as the "thickness dimension of the tray panel unit) in the axial direction of the coil springs that includes the panel main body, the attachment frame, and the coil springs (spring bodies) increases as the axial length of the coil springs increases. Furthermore, the overhang width of the tray panel unit from the front end of the disk tray increases by a commensurate amount, and the size of the disk apparatus is increased. Furthermore, when the wire diameter of the coil springs is increased in order to increase the elastic force of the coil springs, and the pitch of the coil parts of the coil springs is enlarged in order to increase the amount of extension and contraction of the coil springs, the axial length of the coil springs increases by a commensurate amount, and the problems described above become more severe.

When coil springs are used as the spring bodies, the spring urging mechanisms is provided in two locations in the transverse direction of the tray panel unit in order to suppress the rotational shifting of the panel main body and prevent misalignment thereof. Therefore, at least two spring bodies are necessary, and the cost of parts and assembly are increased.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a disk apparatus having a thinner tray panel unit.

In accordance with one aspect of the present invention, a disk apparatus includes a chassis, a disk tray and a tray panel unit. The chassis has a front panel with a tray opening. The disk tray is movable between an ejected position and a retracted position through the tray opening of the front panel. The tray panel unit is provided to a front end part of the disk tray. The tray panel unit includes a panel main body and a spring body. The panel main body covers the tray opening of the front panel when the disk tray is retracted to the retracted position. The spring body elastically couples the panel main body to the disk tray and biases the panel main body against a receiving frame part of the front panel formed around the tray opening when the disk tray is retracted to the retracted position. The spring body has a coil part, a pair of end attachment parts and a middle attachment part. The coil part includes a wire helically wound. An axial direction of the coil part is aligned with a width direction of the tray panel unit. The pair of end attachment parts extends from both axial ends of the coil part, respectively. The end attachment parts are fixedly coupled to one of the panel main body and the front end part of the disk tray. The middle attachment part is provided to an axial middle portion of the coil part. The middle attachment part is fixedly coupled to the other of the panel main body and the front end part of the disk tray.

With the disk apparatus of the present invention, it is possible to provide a disk apparatus having a thinner tray panel unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
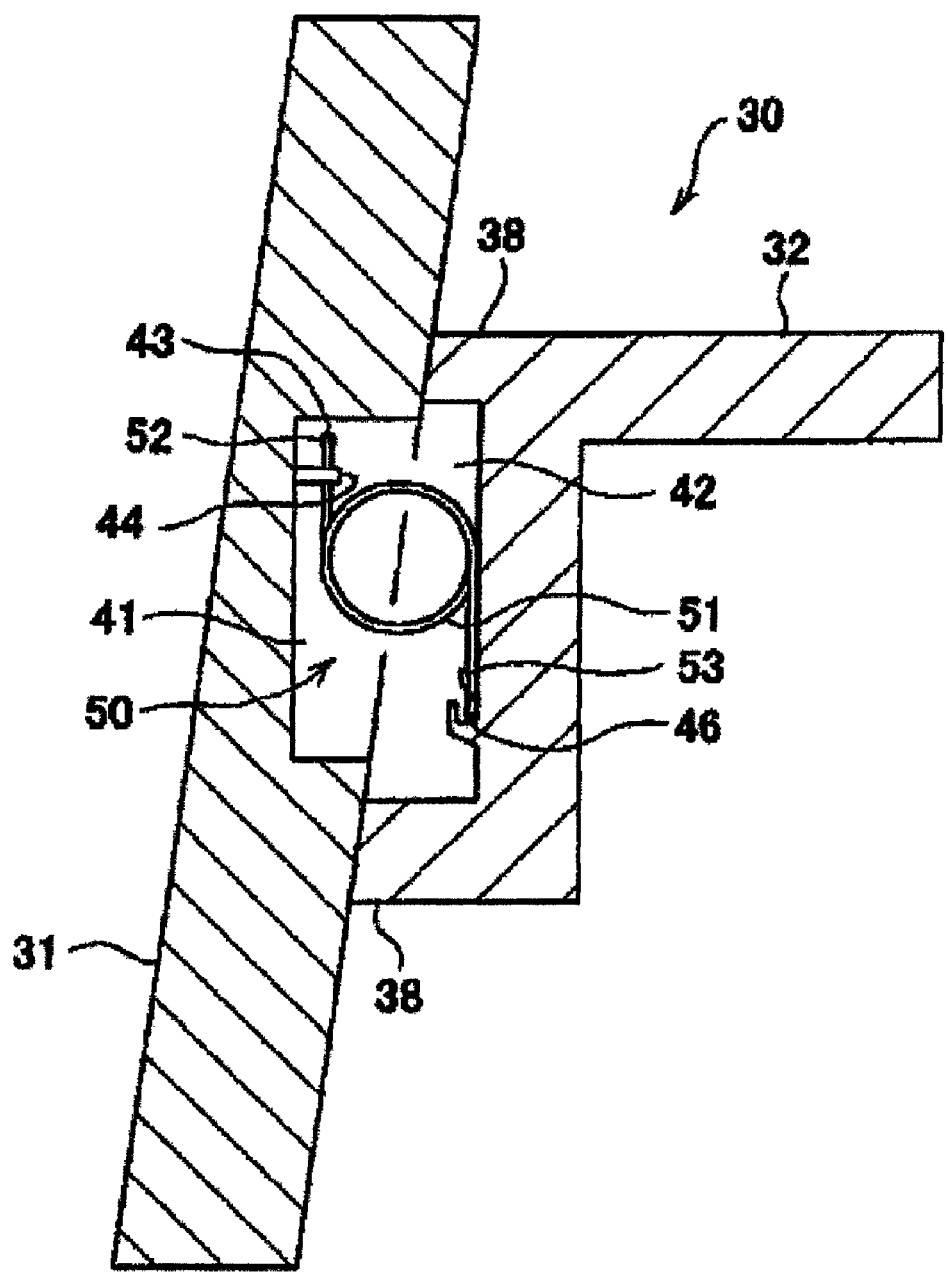
FIG. 1 is a transverse cross sectional view of a tray panel unit of a disk apparatus in accordance with one embodiment of the present invention.

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

As shown in FIGS. 1-8, a disk apparatus includes a device frame 10, a disk tray, 20 and a tray panel unit 30. The disk tray 20 is attached to the device frame 10 so as to be able to move in and out. The disk tray 20 is used to load a disk (not shown) as a recording medium into the device frame 10 and eject the disk forward with respect to the device frame 10. When a disk is mounted on the disk tray 20 and loaded into the device frame 10, the recording surface of the disk is optically processed, and information is recorded or retrieved. The tray panel unit 30 is mounted to a front end part of the disk tray 20. The disk apparatus further includes well known optical components that guide light to the disk to record and retrieve the information, well known mechanical components that move the disk tray 20 and rotate the disk, and well known electronic components that process signal to control the disk apparatus. However, the descriptions of the components may be omitted for the sake of brevity since well known components can be used in the disk apparatus as the optical components, the mechanical components and the electronic components.

The disk apparatus is accommodated by a chassis 90. The chassis 90 includes a front panel 100 with a tray exit/entry opening (e.g., tray opening) 110. The disk tray 20 of the disk apparatus exits and enters through the tray exit/entry opening 110, and the disk tray 20 moves in and out between a disk ejecting position (e.g., ejected position of the disk tray) and a disk loading position (e.g., retracted position of the disk tray) through the tray exit/entry opening 110. The front panel 100 further includes a receiving frame part 120 formed around the tray exit/entry opening 110.

As shown in FIG. 1, the tray panel unit 30 includes a panel main body 31, an attachment frame 32 and a torsion spring (e.g., spring body) 50. The panel main body 31 has a horizontally elongated shape. The panel main body 31 is formed as a one-piece, unitary member. The panel main body 31 covers the tray exit/entry opening 110 when the disk tray 20 is retracted to the disk loading position. The attachment frame 32 has a horizontally elongated shape. The attachment frame 32 is fixed to the front end part of the disk tray 20. The attachment frame 32 is formed as a one-piece, unitary member, and is formed separately from the disk tray 20. The torsion spring 50 is used as a spring body that elastically couples the panel main body 31 to the attachment frame 32. The panel main body 31 is always elastically urged toward the attachment frame 32 by restoring action of the torsion spring 50. The attachment frame 32 includes a receiving part 38 that braces the panel main body 31 urged by the torsion spring 50 and suppresses wobble in the panel main body 31.

Figure 3:
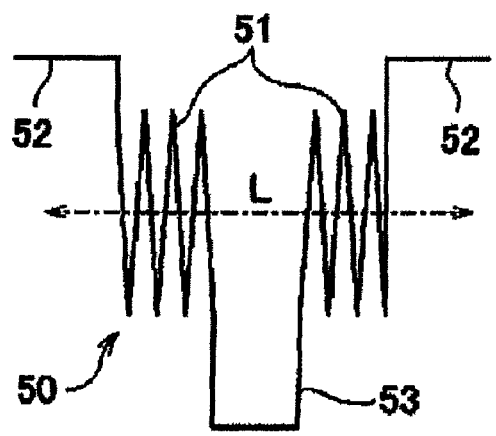
FIG. 3 is a schematic front view of a torsion spring of the tray panel unit.

As shown in FIG. 3, the torsion spring 50 has a coil part 51, a pair of end attachment parts 52 and a middle attachment part 53. The torsion spring 50 is formed as a one-piece, unitary member. The coil part 51 is formed by a wire with a predetermined diameter that is helically wound. The end attachment parts 52 are provided to both ends in the axial direction of the coil part 51. The middle attachment part 53 is provided to the middle portion in the axial direction (the center part in the axial direction) of the coil part 51. Consequently, the coil part 51 is divided into left and right parts by the middle attachment part 53. In the torsion spring 50, the left and right end attachment parts 52 are formed by bending both end parts of the wire that forms the coil part 51 to the outside in the axial direction of the coil part 51. The middle attachment part 53 is formed by bending the middle portion of the wire that forms the coil part 51 into a U shape.

Figure 2:
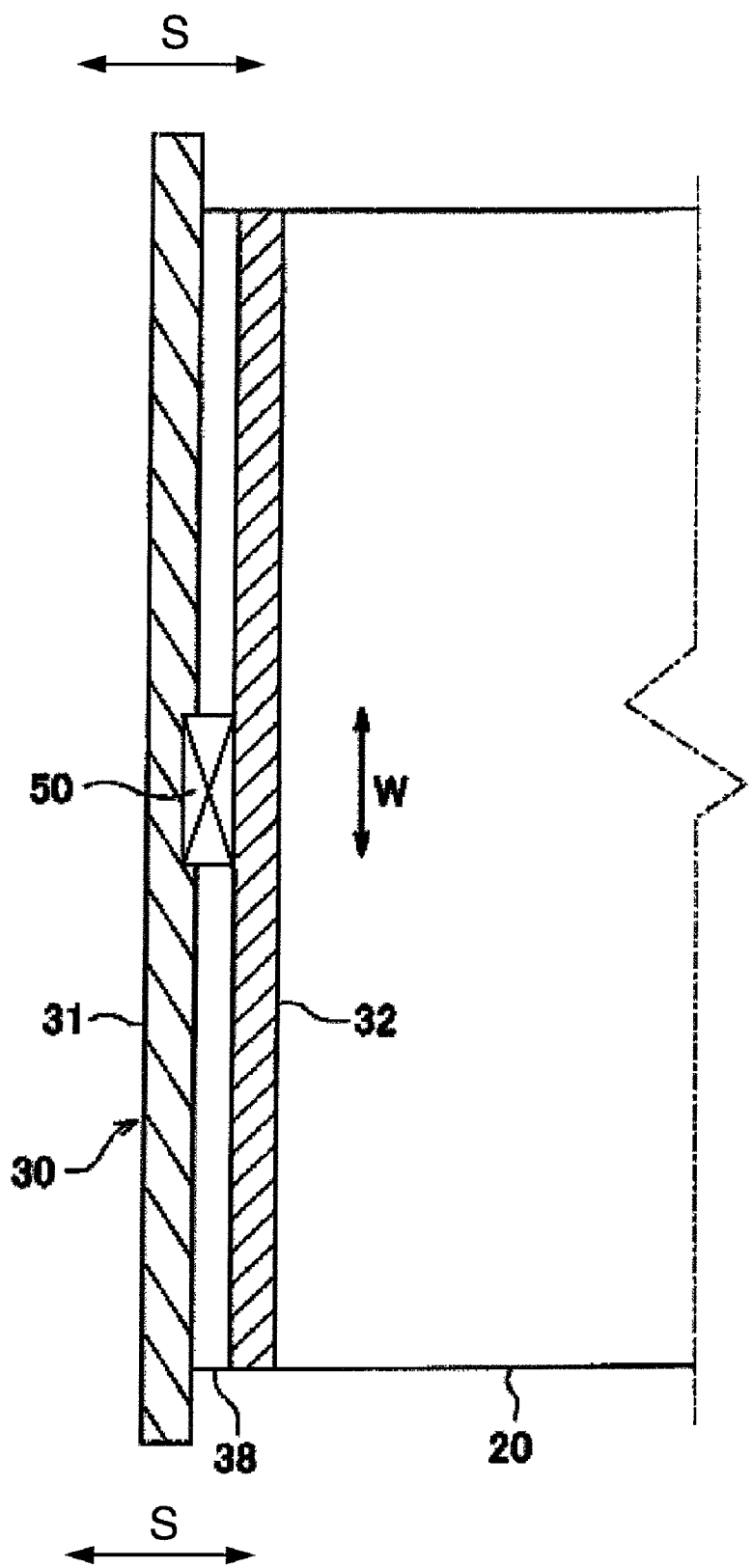
FIG. 2 is a longitudinal cross sectional view of the tray panel unit of the disk apparatus.

As shown in FIG. 2, the torsion spring 50 is provided in only one location between the panel main body 31 and the attachment frame 32, in a position at the center in a width direction W of the disk tray 20 (e.g., width direction of the tray panel unit) to which the attachment frame 32 of the tray panel unit 30 is fixed. The width direction W is a direction perpendicular to the ejection and loading direction of the disk tray 20. Therefore, in the disk apparatus, the number of spring bodies used in the tray panel unit 30 is one, which is the torsion spring 50.

As shown in FIGS. 1 and 2, the entire torsion spring 50 is accommodated in concave parts 41, 42 formed in the panel main body 31 and the attachment frame 32, respectively. The torsion spring 50 is provided in the space between the panel main body 31 and the attachment frame 32. The axial direction (indicated by the reference symbol L in FIG. 3) of the coil part 51 of the torsion spring 50 is aligned with the width direction W of the disk tray 20. Therefore, when the disk tray 20 is moved forward toward the ejecting position, a back surface (e.g., rear face) of the panel main body 31 is contacted by the receiving part 38 positioned at the front end of the attachment frame 32 due to the elastic restoring force of the torsion spring 50. Specifically, the torsion spring 50 biases the panel main body 31 against the attachment frame 32 so that the back face of the panel main body 31 is spaced from the receiving frame part 120 of the front panel 100. The torsion spring 50 is hidden by the panel main body 31 and the attachment frame 32. As a result, the torsion spring 50 is less noticeable, and a good appearance of the tray panel unit 30 is maintained. Furthermore, the overall profile of the tray panel unit 30 is markedly reduced in size.

Various configurations may be adopted in the structure for fixing the end attachment parts 52 and middle attachment part 53 of the torsion spring 50 to the panel main body 31 and the attachment frame 32. Specifically, as shown in FIG. 1, the left and right end attachment parts 52 are inserted in attachment holes 43 provided on the panel main body 31, and the end attachment parts 52 are held down against the attachment holes 43 by retaining protrusions 44 on the panel main body 31 so that wobbling thereof is prevented. The middle attachment part 53 is inserted in a groove 46 provided on the attachment frame 32 and retained so as not to wobble. Specifically, the attachment frame 32 includes a distal end latching prong and side latching prongs formed on a front side face in the concave parts 42 around the groove 46. The distal end latching prong latches a distal end part of the middle attachment part 53 towards the front side face of the attachment frame 32. The side latching prongs positions the middle attachment part 53 on the front side face of the attachment frame 32 in the width direction W of the disk tray 20. In FIG. 1, the end attachment parts 52 are fixed to the panel main body 31, and the middle attachment part 53 is fixed to the attachment frame 32. However, the end attachment parts 52 can be fixed to the attachment frame 32, and the middle attachment part 53 can be fixed to the panel main body 31.

The entire torsion spring 50 is accommodated in the concave parts 41, 42 formed in both the panel main body 31 and the attachment frame 32, and the torsion spring 50 is thereby covered. However, the entire torsion spring 50 can also be accommodated in a concave part formed in any one of the panel main body 31 and the attachment frame 32. The end attachment parts 52 of the torsion spring 50 can also be fixed to the attachment frame 32, and the middle attachment part 53 can be fixed to the panel main body 31.

With the tray panel unit 30, the left and right end attachment parts 52 of the torsion spring 50 are fixed and connected to the panel main body 31, and the middle attachment part 53 is connected to the front end part of the disk tray 20 via the attachment frame 32.

With the tray panel unit 30, the torsion spring 50 exerts an effect of elastically pulling the panel main body 31 to the attachment frame 32. The elastic force of the torsion spring 50 is obtained by bending the axis of the coil part 51 against the elasticity thereof in advance to cause the torsion spring 50 to exert elastic force that extends the axis in a straight line, as well as by applying the restoring counterforce of the end attachment parts 52 and the middle attachment part 53 of the torsion spring 50 on the panel main body 31 and the attachment frame 32.

Figure 4:
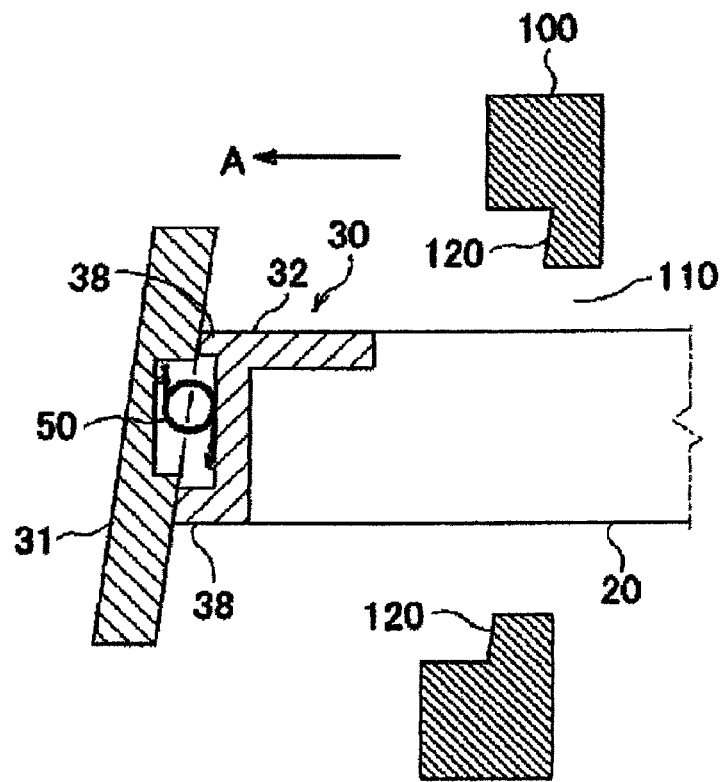
FIG. 4 is a transverse cross sectional view of the tray panel unit when a disk tray is moved forward toward an ejecting position.
Figure 5:
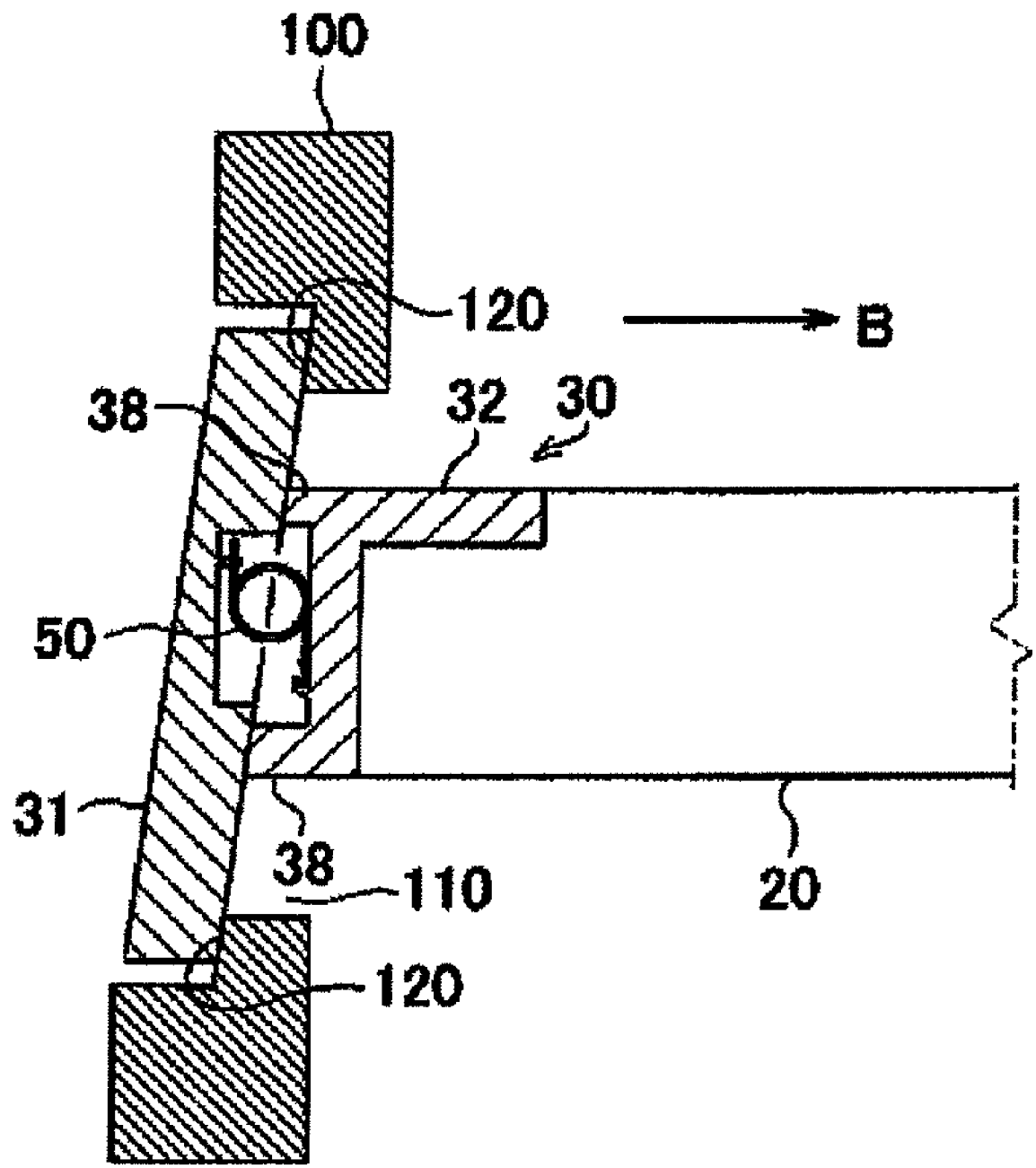
FIG. 5 is a transverse cross sectional view of the tray panel unit when the disk tray is retracted toward a loading position.
Figure 6:
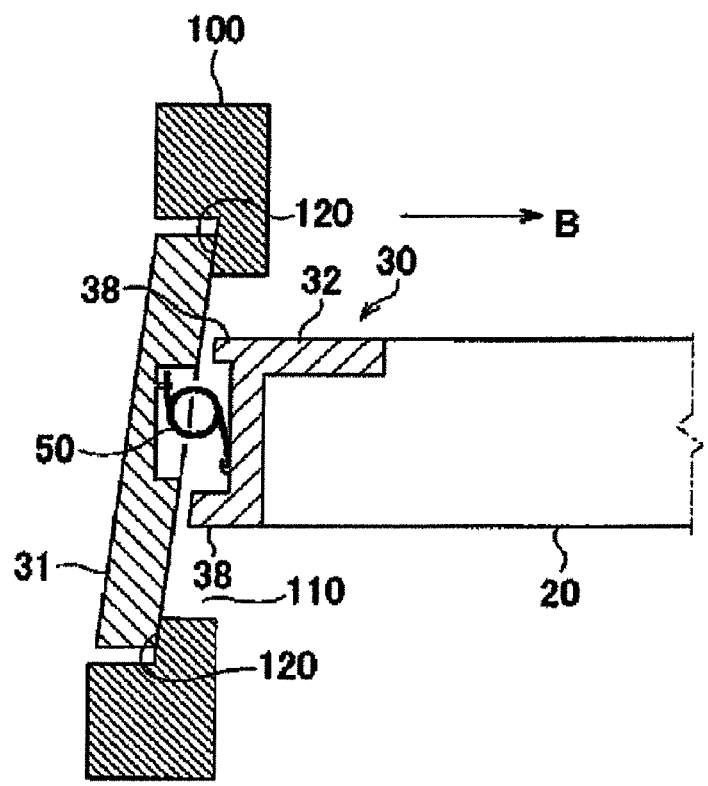
FIG. 6 is a transverse cross sectional view of the tray panel when the disk tray has been retracted to the loading position.
Figure 7:
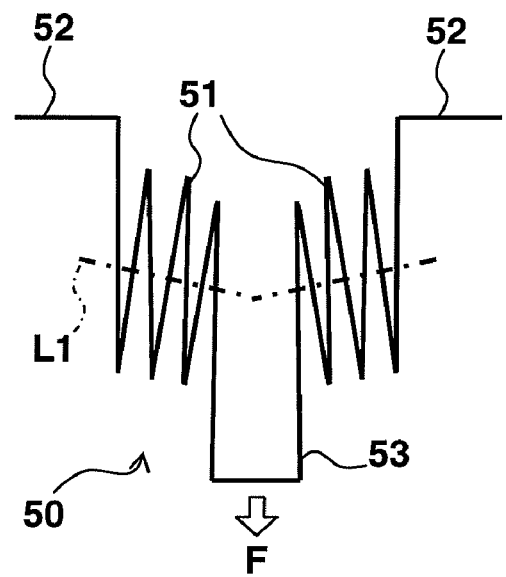
FIG. 7 is a schematic front view of the torsion spring in which an axis line is bent and a restoring counterforce is generated.
Figure 8:
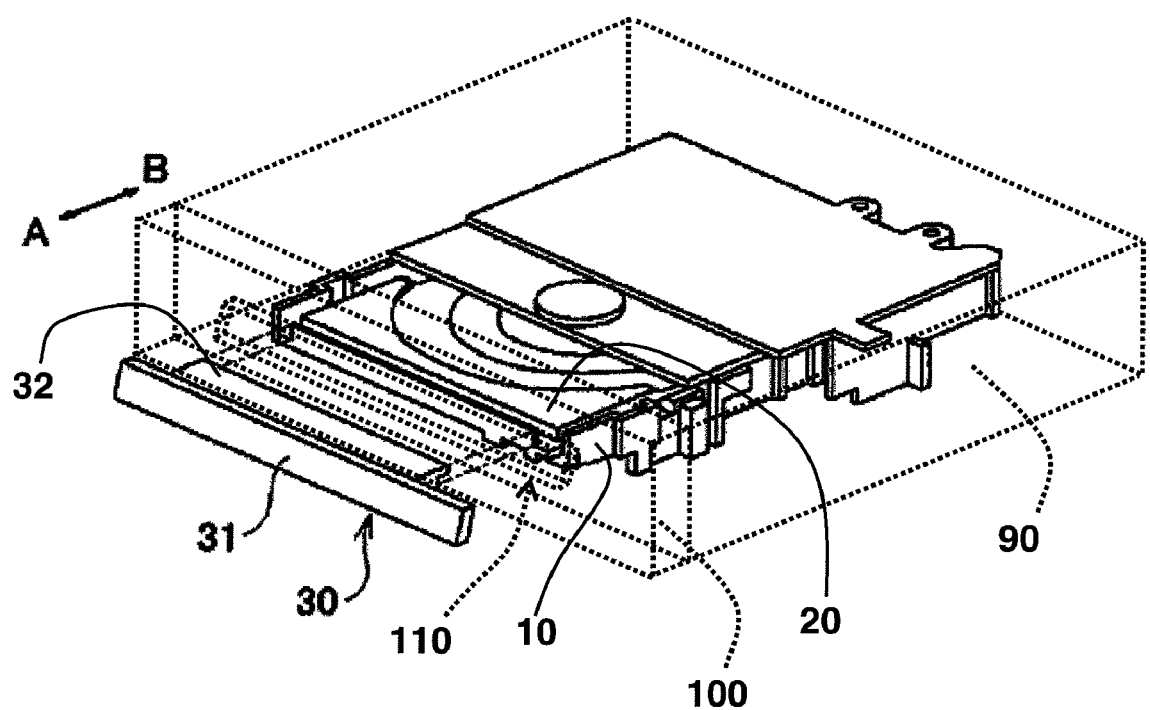
FIG. 8 is a schematic perspective view of the disk apparatus having the tray panel unit

FIGS. 4 through 6 show the relationship between the tray exit/entry opening 110 of the front panel 100 of the chassis 90 and the tray panel unit 30 that is mounted to the front end of the disk tray 20. Specifically, FIG. 4 is a transverse cross sectional view showing the relationship between the tray exit/entry opening 110 and the tray panel unit 30 when the disk tray 20 is moved forward as indicated by the arrow A toward the ejecting position. FIG. 5 is a traverse cross sectional view showing the relationship between the tray exit/entry opening 110 and the tray panel unit 30 when the disk tray 20 is retracted as indicated by the arrow B toward the loading position. FIG. 6 is a traverse cross sectional view showing the relationship between the tray exit/entry opening 110 and the tray panel unit 30 when the disk tray 20 retracted as indicated by the arrow B has been retracted to (has reached) the loading position.

In the disk apparatus, when the disk tray 20 has been moved forward as indicated by the arrow A toward the ejecting position as shown in FIG. 4, since the disk tray 20 protrudes forward from the tray exit/entry opening 110, the panel main body 31 of the tray panel unit 30 is separated from the receiving frame part 120 of the tray exit/entry opening 110. Therefore, the panel main body 31 is elastically pulled toward the attachment frame 32 by the action of the torsion spring 50, and the panel main body 31 contacts with the receiving part 38 of the attachment frame 32.

However, when the disk tray 20 is retracted as indicated by the arrow B toward the loading position as shown in FIG. 5, the panel main body 31 of the tray panel unit 30 contacts with the receiving frame part 120 provided to the tray exit/entry opening 110 immediately before the disk tray 20 reaches the loading position. As shown in FIG. 6, when the disk tray 20 retracts as indicated by the arrow B toward the loading position and reaches the loading position, the attachment frame 32 of the tray panel unit 30 that is mounted to the disk tray 20 deforms the torsion spring 50 against the elasticity thereof and separates from the panel main body 31. The tray exit/entry opening 110 is therefore blocked in a state in which the panel main body 31 is pressed against the receiving frame part 120 of the device frame tray exit/entry opening 110.

The tension on the panel main body 31 when the tray exit/entry opening 110 is blocked in a state in which the panel main body 31 is pressed against the receiving frame part 120 of the tray exit/entry opening 110 as shown in FIG. 6 is created by the elastic restoring counterforce of the torsion spring 50. Specifically, at this time, the middle attachment part 53 in the axial direction of the coil part 51 of the torsion spring 50 is pulled by the attachment frame 32 (see FIG. 6) as indicated by the arrow F in FIG. 7, and the axis L1 of the coil part 51 is bent in an L shape. Since a restoring counterforce is thereby created, the abovementioned tension is created by the restoring counterforce. Specifically, the axial direction of the coil part 51 is aligned with the width direction W of the disk tray 20 during the back face of the panel main body 31 is separated from the receiving frame part 120 of the front panel 100 and the back face of the panel main body 31 contacts with the receiving par 38 of the attachment frame 32. Furthermore, the axis L1 of the coil part 51 is bent with respect to the width direction W of the disk tray 20 during the back face of the panel main body 31 contacts with the receiving frame part 120 of the front panel 100.

When the disk tray 20 is retracted toward the loading position, the panel main body 31 contacts with the receiving frame part 120 of the tray exit/entry opening 110 just before the disk tray 20 reaches the loading position. The attachment frame 32 then separates from the panel main body 31 against the urging of the torsion spring 50, and the disk tray 20 reaches the loading position. At this time, the impact experienced by the front panel 100 and other components when the panel main body 31 collides with the receiving frame part 120 is absorbed and mitigated by the elastic deformation of the torsion spring 50. The gap between the panel main body 31 and the receiving frame part 120 of the tray exit/entry opening 110 closes and becomes less noticeable. The collision noise is reduced and the operating quality of the disk apparatus is enhanced, and it is easier to absorb error in the assembly precision of the disk tray 20 and other components. Besides the panel main body 31 prevents entry of debris from the tray exit/entry opening 110 when the tray exit/entry opening 110 is blocked in a state in which the panel main body 31 is pressed against the receiving frame part 120 of the tray exit/entry opening 110 when the disk tray 20 has reached the loading position. Thus, it is harder for wind noise or the like created by the disk rotation to escape from the tray exit/entry opening 110.

By providing the torsion spring 50 as the spring body so that the axial direction L of the coil part 51 is aligned with the width direction W of the disk tray 20, increasing the wire diameter of the torsion spring 50 in order to increase the elastic force of the spring body, or increasing or reducing the length of the torsion spring 50 to adjust the restoring counterforce of the torsion spring 50 does not result in a significant change in the thickness dimension of the tray panel unit 30. Since the diameter of the coil part 51 of the torsion spring 50 can be extremely small (i.e., about 3 mm) in comparison to the axis length of the coil springs used in the conventional example and other designs, the profile of the tray panel unit 30 can easily be reduced in size.

The torsion spring 50 is provided in only one location between the panel main body 31 and the attachment frame 32 in the center position in the width direction W of the disk tray 20. Since the end attachment parts 52 on both ends in the axial direction of the coil part 51 of the torsion spring 50 are fixed to the panel main body 31 in two locations that are spaced apart by an amount commensurate with the length of the coil part 51, swinging of the panel main body 31 such as indicated by the arrow S in FIG. 2 is suppressed, i.e., swinging of one or the other end of the panel main body 31 toward or away with respect to the front end of the disk tray 20 is suppressed. Furthermore, rotational shifting of the panel main body 31 is also suppressed.

The tray panel unit 30 has the panel main body 31, the torsion spring 50 and the attachment frame 32 fixed to the end part of the disk tray 20. The end attachment parts 52 are fixed on the panel main body 31. The middle attachment part is fixed on the attachment frame 32. When this configuration is adopted, the same ease of assembly as in the conventional example is maintained in mounting of the panel main body 31 to the front end part of the disk tray 20. Specifically, the tray panel unit 30 has a so-called double structure in which the attachment frame 32 is provided in addition to the panel main body 31, and the ease of mounting to the disk tray 20 can be enhanced.

The torsion spring 50 is preferably provided in only one location between the panel main body 31 and the attachment frame 32 in a center position in the width direction of the disk tray 20. Even when this configuration is used, rotational shifting of the panel main body 31 is suppressed by the elasticity of the torsion spring 50 in which the axial direction of the coil part 51 is aligned with the width direction of the disk tray 20. The necessary number of torsion springs as the spring body can therefore be reduced to only one, the necessary number of spring bodies can be reduced in comparison to the conventional example and other designs, and the cost of parts and assembly can be kept low.

The end attachment parts 52 of the torsion spring 50 is preferably formed by both end parts of the wire that forms the coil part 51 of the torsion spring 50, and the middle attachment part 53 is preferably formed by a middle part of the wire that forms the coil part 51. According to this configuration, the end attachment parts 52 and middle attachment part 53 of the torsion spring 50 can be formed without the use of additional parts.

Figure 9:
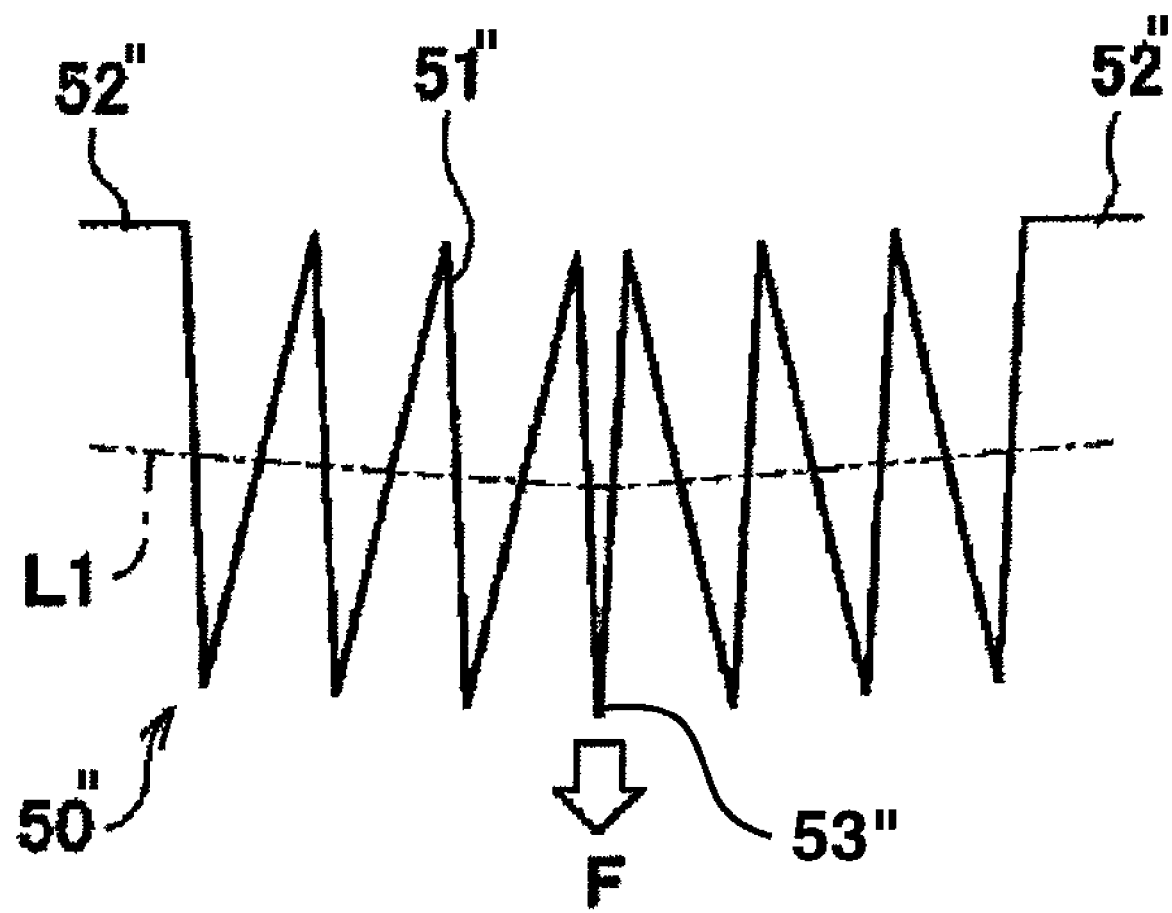
FIG. 9 is a schematic front view of a coil spring in accordance with another example of a spring body.

As shown in FIG. 3, the torsion spring 50 includes double torsion springs having one right-hand wound coil part 51 and one left-hand wound coil part 51 connected together with the middle attachment part 53, and working in parallel. However, as shown in FIG. 9, a coil spring 50" as a spring body can include single coil spring having end attachment parts 52" extending from both ends of a coil part 51". The coil part 51" has a right-hand wound coil or a left-hand wound coil. The end attachment parts 52" are fixedly attached to one of the panel main body 31 and the attachment frame 32. A middle attachment part 53" of the coil spring 50" is pinched to the other of the panel main body 31 and the attachment frame 32, and fixedly attached to the other of the panel main body 31 and the attachment frame 32.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk apparatus equipped with the present invention. Accordingly, these terms, as utilized to describe the present invention should be interpreted relative to a disk apparatus equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A disk apparatus comprising:
   a chassis having a front panel with a tray opening;
   a disk tray movable between an ejected position and a retracted position through the tray opening of the front panel; and
   a tray panel unit provided to a front end part of the disk tray, the tray panel unit including
     a panel main body covering the tray opening of the front panel when the disk tray is retracted to the retracted position, and
     a spring body elastically coupling the panel main body to the disk tray and biasing the panel main body against a receiving frame part of the front panel formed around the tray opening when the disk tray is retracted to the retracted position, the spring body having
       a coil part including a wire helically wound, with an axial direction of the coil part being aligned with a width direction of the tray panel unit,
       a pair of end attachment parts extending from both axial ends of the coil part, respectively, with the end attachment parts being fixedly coupled to one of the panel main body and the front end part of the disk tray, and
       a middle attachment part provided to an axial middle portion of the coil part, with the middle attachment part being fixedly coupled to the other of the panel main body and the front end part of the disk tray.

2. The disk apparatus according to claim 1, wherein
the tray panel unit further includes an attachment frame fixedly attached to the front end part of the disk tray, the end attachment parts of the spring body being fixedly attached to one of the panel main body and the attachment frame, the middle attachment part of the spring body being fixedly attached to the other of the panel main body and the attachment frame.

3. The disk apparatus according to claim 2, wherein
the spring body includes a torsion spring.

4. The disk apparatus according to claim 3, wherein
the spring body is provided at only one location of the tray panel unit in the width direction of the tray panel unit.

5. The disk apparatus according to claim 4, wherein
the spring body is provided at a width center position of the tray panel unit.

6. The disk apparatus according to claim 2, wherein
the end attachment parts of the spring body are formed by opposite ends of the wire forming the coil part of the spring body, and
the middle attachment part of the spring body is formed by the wire forming the coil part of the spring body.

7. The disk apparatus according to claim 2, wherein
the spring body is disposed in a concave part formed in at least one of the panel main body and the attachment frame when the disk tray is ejected to the ejected position.

8. The disk apparatus according to claim 7, wherein
the spring body biases the panel main body against the attachment frame so that a rear face of the panel main body contacts with a front end part of the attachment frame when the disk tray is ejected to the ejected position.

9. The disk apparatus according to claim 2, wherein
the spring body biases the panel main body against the attachment frame so that a rear face of the panel main body contacts with a front end part of the attachment frame when the panel main body is separated from the receiving frame part of the front panel.

* * * * *